(12) United States Patent
Flath et al.

(10) Patent No.: US 9,090,253 B2
(45) Date of Patent: Jul. 28, 2015

(54) METHOD AND APPARATUS FOR VEHICULAR ENERGY MANAGEMENT

(71) Applicants: Jeffrey C. Flath, Warwick, RI (US);
Robert Doane, Harwich, MA (US);
John Mallon, Wakefield, RI (US);
Theodore B. Howell, Warwick, RI (US);
Gary T. Wenger, Harvard, MA (US);
Philip R. Pierce, Fernandina Beach, FL (US)

(72) Inventors: Jeffrey C. Flath, Warwick, RI (US);
Robert Doane, Harwich, MA (US);
John Mallon, Wakefield, RI (US);
Theodore B. Howell, Warwick, RI (US);
Gary T. Wenger, Harvard, MA (US);
Philip R. Pierce, Fernandina Beach, FL (US)

(73) Assignee: eNow, Inc., Warwick, RI (US)

( * ) Notice: Subject to any disclaimer, the term of this patent is extended or adjusted under 35 U.S.C. 154(b) by 138 days.

(21) Appl. No.: 13/752,765

(22) Filed: Jan. 29, 2013

(65) Prior Publication Data
US 2013/0231808 A1    Sep. 5, 2013

Related U.S. Application Data

(60) Provisional application No. 61/592,252, filed on Jan. 30, 2012.

(51) Int. Cl.
| | |
|---|---|
| *B60W 20/00* | (2006.01) |
| *B60W 10/26* | (2006.01) |
| *B60W 10/30* | (2006.01) |
| *B60K 16/00* | (2006.01) |

(52) U.S. Cl.
CPC ............. *B60W 20/102* (2013.01); *B60K 16/00* (2013.01); *B60W 10/26* (2013.01); *B60W 10/30* (2013.01); *B60K 2016/003* (2013.01); *B60Y 2200/14* (2013.01); *B60Y 2200/145* (2013.01); *B60Y 2200/148* (2013.01); *Y02T 10/84* (2013.01); *Y02T 10/90* (2013.01); *Y10S 903/903* (2013.01)

(58) Field of Classification Search
USPC .......... 701/22; 180/65.31; 903/907; 136/243, 136/244
See application file for complete search history.

(56) References Cited

U.S. PATENT DOCUMENTS

| | | | |
|---|---|---|---|
| 6,534,950 B2 * | 3/2003 | LeBoe | 320/104 |
| 7,338,335 B1 * | 3/2008 | Messano | 180/65.22 |
| 8,295,950 B1 | 10/2012 | Wordsworth et al. | |
| 2009/0207543 A1 * | 8/2009 | Boniface et al. | 361/86 |
| 2010/0138142 A1 * | 6/2010 | Pease | 701/123 |
| 2010/0301771 A1 * | 12/2010 | Chemel et al. | 315/294 |
| 2010/0327600 A1 * | 12/2010 | Koelsch et al. | 290/1 A |
| 2011/0266876 A1 * | 11/2011 | Lauinger et al. | 307/71 |
| 2012/0013191 A1 * | 1/2012 | Jeandeaud | 307/80 |
| 2012/0175961 A1 * | 7/2012 | Har-Shai et al. | 307/80 |
| 2012/0226572 A1 * | 9/2012 | Park et al. | 705/26.1 |
| 2013/0098420 A1 * | 4/2013 | Sherman et al. | 136/244 |
| 2014/0030841 A1 * | 1/2014 | Armstrong et al. | 438/67 |

\* cited by examiner

*Primary Examiner* — John R Olszewski
*Assistant Examiner* — James M McPherson
(74) *Attorney, Agent, or Firm* — Chapin IP Law, LLC

(57) ABSTRACT

A vehicle energy management system for gathering, storing the energy, and distributing the stored energy supports various subsystems on the vehicle such as driver comfort systems, payload refrigeration, liftgate mechanisms, and roof de-icing, for example. The system harvests energy from various sources available to the vehicle, such as solar panels, regenerative braking and shock absorbers. The harvested energy is gathered for battery storage. Management logic allocates the stored electricity to various vehicle loads defined by the subsystems, based on factors such as time of day, ambient temperature, and weather conditions, which are used to predict the electrical demand called for by the loads. Harvestable energy sources available to the vehicle, combined with sufficient battery storage, provides electrical power for supporting these loads without relying on an idling engine for providing electrical or hydraulic power to accommodate the vehicle subsystems, such as comfort stations for an idle-free vehicle implementation.

22 Claims, 17 Drawing Sheets

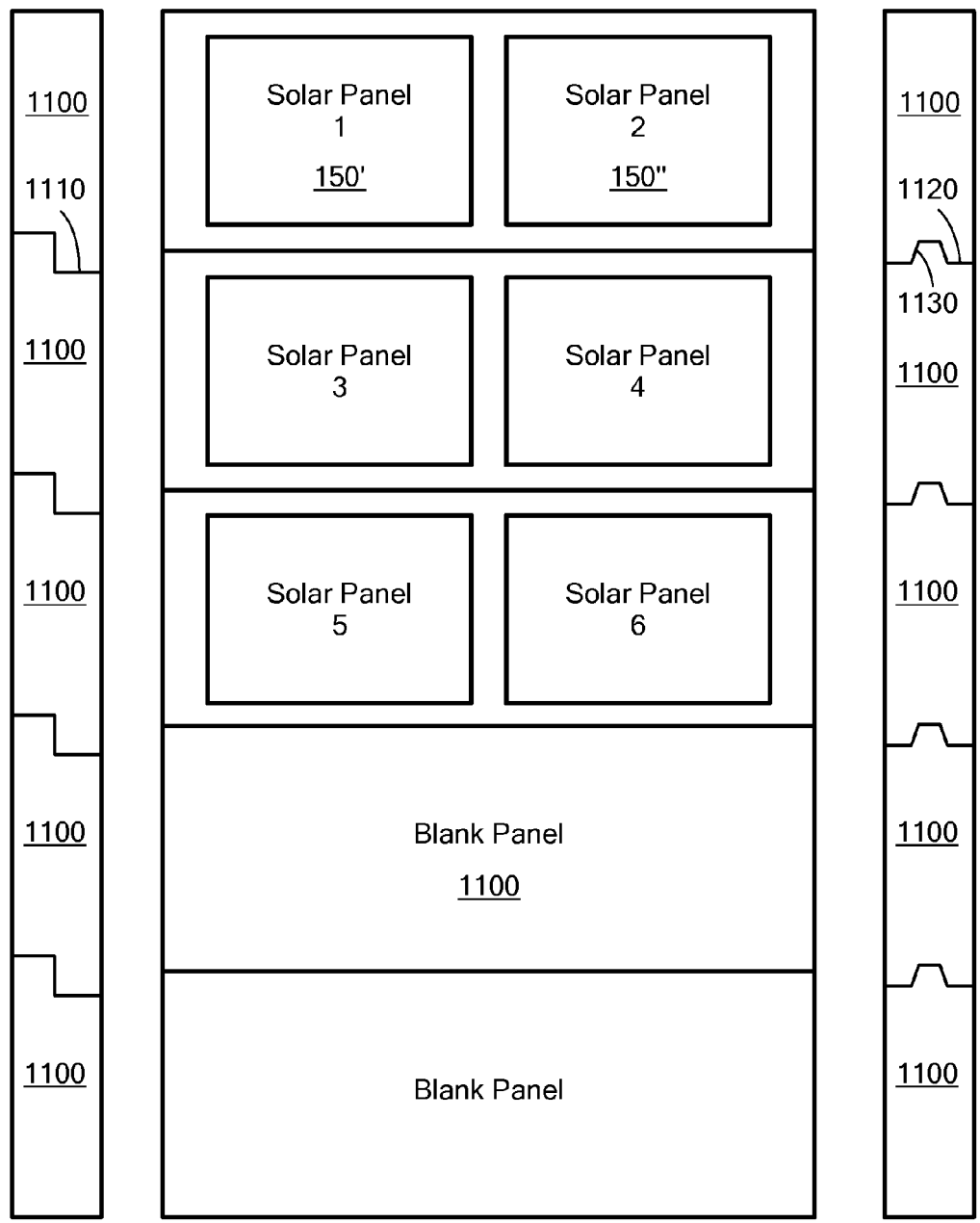
*FIG. 4N*   *FIG. 4M*   *FIG. 4O*

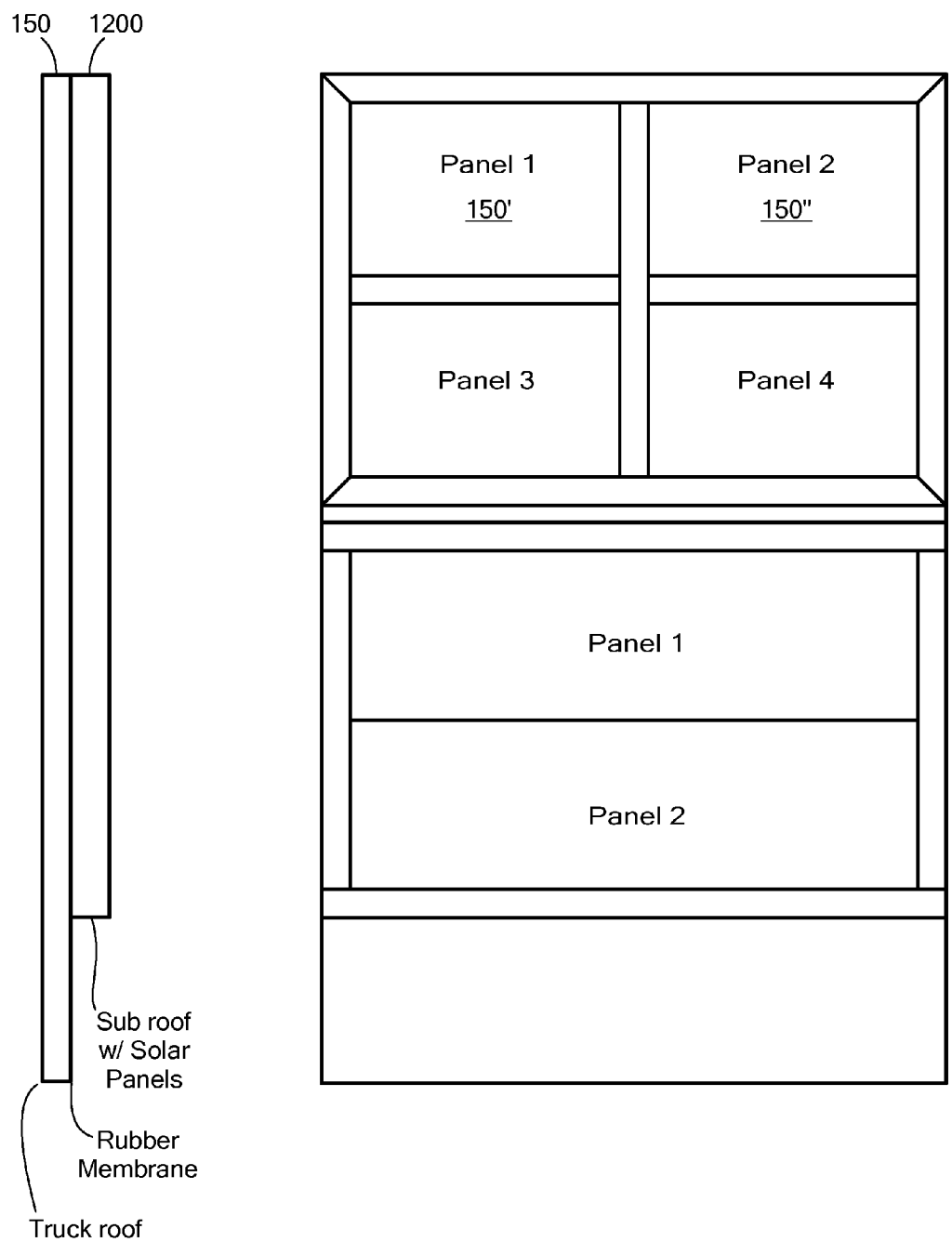

METHOD AND APPARATUS FOR VEHICULAR ENERGY MANAGEMENT

RELATED APPLICATIONS

This application claims the benefit under 35 U.S.C. §119 (e) of U.S. Provisional Patent Application No. 61/592,252, filed Jan. 30, 2012, entitled "CONFIGURABLE SOLAR PANEL BUSBAR INTERCONNECT," incorporated herein by reference in entirety.

BACKGROUND

Modern focus on energy conservation is becoming increasingly popular as emerging technologies seek to leverage previously untapped energy sources. Many corporations are seeking energy conserving and environmentally friendly practices in an effort to label their business pursuits as "green." Particularly in the transportation industry, where dependence on petroleum-based fuels has underscored the need for improvement towards energy independence, energy sources and costs are particularly scrutinized. Legislative activities have also compelled energy conscious strategies, from voluntary measures such as tax incentives, to mandates such as laws limiting vehicle idling time, such that energy considerations are a necessary aspect of any commercial endeavor in the transportation industry.

SUMMARY

A vehicle energy management system employs a method and apparatus for gathering, storing the energy, and distributing the stored energy to various subsystems on the vehicle such as driver comfort systems, payload refrigeration, liftgate mechanisms, and roof de-icing, for example. The system harvests energy from various sources available to the vehicle, such as solar panels, regenerative braking, shock absorbers, and of course, the vehicle alternator or generator. The harvestable energy is gathered or converted to an electrical form for battery storage. Management logic allocates the stored electricity to various vehicle loads defined by the subsystems, based on factors such as time of day, ambient temperature, and weather conditions, which are used to predict the electrical demand called for by the loads. Harvested energy is in excess of that needed for the charging and starting system for the vehicle primary propulsion (i.e. diesel engine), and the approach disclosed herein attempts to gather energy that would otherwise go unrecovered. The harvested energy is then employed for loads which traditionally may have been powered by the vehicle alternator from an idling engine, such as vehicle HVAC or comfort systems.

Heavy duty and long haul trucks, typically referred to as "18 wheelers" due to two double axle sets often employed on such vehicles, may employ a variety of subsystems for safety, driver comfort, and convenience. Such subsystems may include comfort stations for providing amenities including heat, air conditioning and video for the driver, cold plate or other refrigeration capabilities for perishable payloads, liftgate operation, and roof de-icing. Each of these subsystems draws an electrical load for operation. Conventional approaches may simply rely on an idling vehicle engine for drawing power directly off the vehicle alternator for providing power to these loads.

Harvestable energy sources available to the vehicle, combined with sufficient battery storage, provides electrical power for supporting these loads without relying on an idling engine for providing electrical or hydraulic power to accommodate the vehicle subsystems, such as comfort stations for an idle-free vehicle implementation. The harvestable energy sources leverage energy that is ignored in conventional approaches, and allowed to dissipate as unrecouped heat or kinetic force due to a lack of interest and equipment for harvesting these sources. Harvestable energy sources available to the vehicle include solar panels exhaust recovery, regenerative braking, regenerative shock absorbers, and also the vehicle alternator after it has sufficiently charged the native starting battery of the vehicle. Further, smaller and shorter range equipment, such as box trucks, may likewise benefit from such energy sources, as there is still substantial roof area for solar harvesting.

Configurations herein are based, in part, on the observation that the trucking industry conventional approaches to vehicle energy management rely on an idling engine for supplying vehicle loads while the vehicle is parked. Therefore, the primary propulsion unit of the vehicle, typically a large diesel engine, is operated solely for the purpose of drawing electrical power off the alternator. Unfortunately, conventional approaches suffer from the shortcoming that substantial energy sources remains untapped in trucks and other vehicles in the way of solar and kinetic energy forces experienced by an exposed, moving vehicle. Roof area on a vehicle, particularly an articulated (i.e. 18-wheel trailer) vehicle represents a substantial unimpeded surface applicable to solar harvesting. Further, movement and by-products of the vehicle movement, such as braking, exhaust, and shock absorbers, represent otherwise untapped sources that, if properly harvested, could yield useable power. Typically, the vehicle alternator used primarily for charging a starting battery, remains a largely untapped energy source the vehicle is in motion, as it has ample power for vehicle lights, controls, etc. Accordingly, configurations herein substantially overcome the shortcoming of unrecouped energy from moving vehicles by providing a vehicle energy management system for identifying and harvesting energy from available sources on the vehicle, and storing the energy for later powering electrical loads in lieu of idling the engine or requiring an external "shore power" plug in arrangement, typically found at truck stops and other places a truck may be temporarily stored/garaged overnight.

For example, in a comfort station application, long distance truckers often rely on a so-called "sleeper cab" truck to rest and recuperate between periods of driving. Such sleeper cabs, typically a compartment behind the driver position, vary in size and amenities. Comfort subsystems provide such amenities, and require power from an available source such as a truckstop connection, vehicle powered alternator/generator, or an idle-free system for powering the comfort subsystems independently of a truckstop or running vehicle engine. Conventional approaches, in contrast, require the vehicle to remain idling to allow power draw from the engine alternator, or employed land-based solutions such as a truckstop hookup. So-called idle-free systems have gained popularity since Federal and state regulation of stationary vehicle idling began restricting such comfort systems from simply drawing from the conventional alternator of the idling/running diesel engine.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
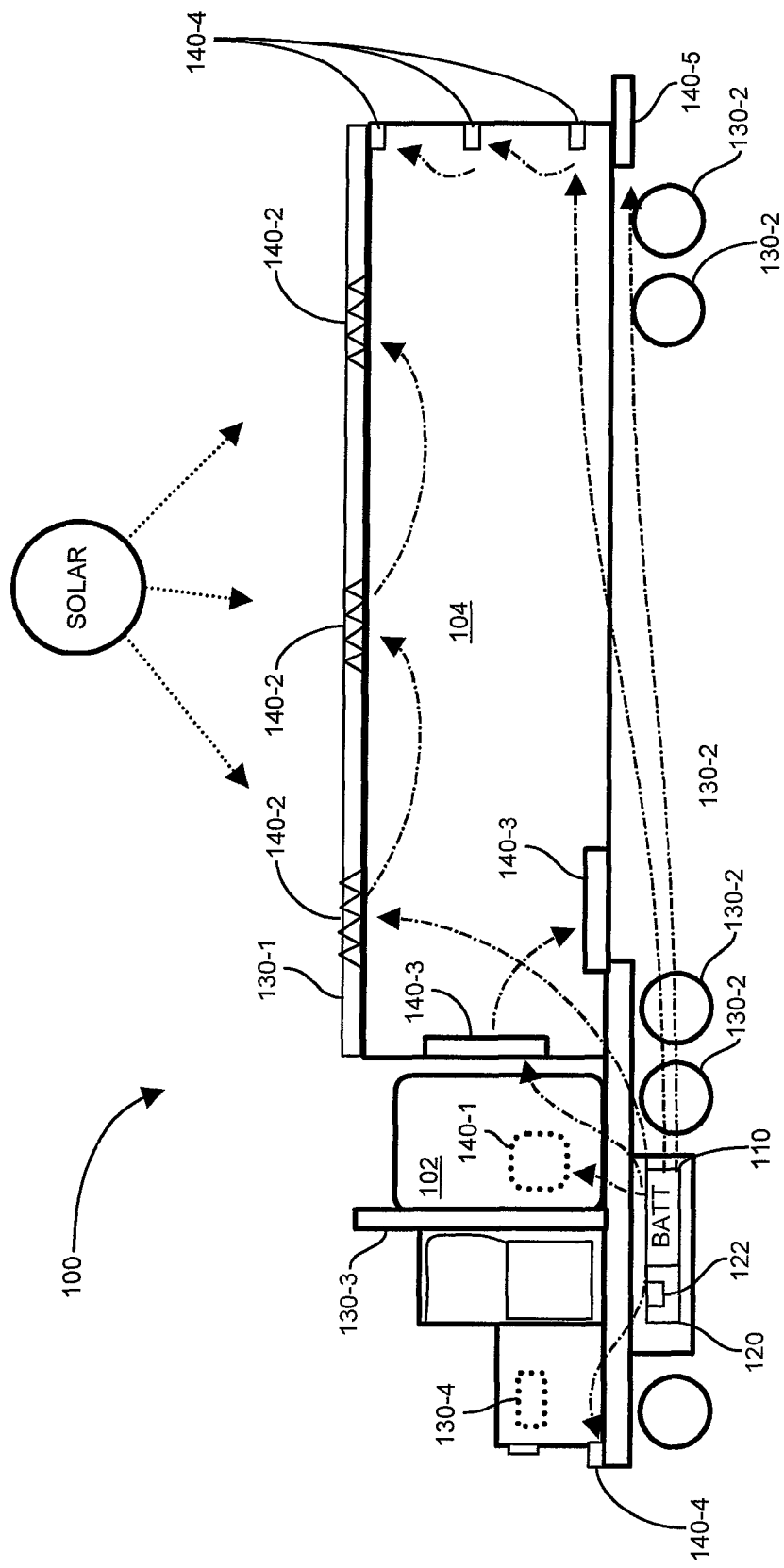
FIG. 1 is a context diagram of the energy storage and management system as shown in configurations herein.

An example configuration, disclosed below, utilizes a plurality of adjacent panels, a busbar, an interconnection box between each panel at the busbar, and optionally employs intelligent (automated) switching, as well as various safety features such as overcurrent and overheating protection, a management controller interface, all discussed further below.

The vehicle energy storage and management system as disclosed herein may be incorporated in a so-called "idle free" system, which maintains certain truck operations without requiring an idling truck engine, in the interest of emission control. In this example, rooftop mounted solar panels employ a configurable solar panel busbar interconnect to optimize trailer roof mounting for idle-free vehicle management. The disclosed approach employs a plurality of optimal sized solar panels and a modular attachment to a busbar interconnecting each of the solar panels on a roof of an articulated vehicle (trailer). A busbar portion bifurcates a photovoltaic solar panel and has a modular connection to adjacent solar panels mounted in contiguous sequence on the trailer roof. The modular connection provides configurable series or parallel electrical communication with the adjacent solar panels for achieving a desired voltage and current (amperage). The configured solar panels provide power for an idle-free vehicle management system providing comfort subsystems such as heating, cooling, cooking and entertainment for sleeper cab vehicles adapted for long distance trucking. Other vehicle systems may also be powered, such as lift gate operation, cargo area cold plate and compression cooling systems, and vehicle operational functions typically powered by the vehicle alternator. The optimal sizing leverages available area on the roof of the trailer, typically the articulated container portion of an 18-wheel tractor trailer.

In contrast to conventional approaches, the configurable modular connection between the panels permits configuration of an electrical supply to the idle-free system for efficiently charging batteries and/or concurrent powering of active comfort stations. Such idle-free systems typically require sufficient battery reserve to power the subsystems in the absence of sunlight to accommodate the driving patterns of the user. The proposed approach employs the modular busbar connection to interconnect a series of panels of a precise width for covering substantially all available roof area for solar harvesting. The configurable modular interconnect allows selection of electrical properties suited to charging and operation of the idle-free system, thus eliminating power loss from converters and transformers.

The modular solar panel and interconnect incorporates features applicable to the transportation industry, among others. The modular panel solves several problems with conventional solar mounting on top of vehicles. The disclosed energy management system allows for internal wire management eliminating or reducing the amount of external wires and eliminating wind resistance. The system incorporates intelligent management that allows for dynamic voltage changes depending upon the energy off-load application; managed solar generation based on GPS and solar irradiance predictions; monitoring the panel's conditions including temperature, voltage and current output, and underperforming status conditions. The system incorporates intelligent safety features that automatically disconnects individual panels when no load is present, and disconnects when accident is detected including accelerometer for sudden stops or impacts and tilt switch for turnovers. Solar panel construction may include a resistive heating element within the laminated panel to aid in snow and ice removal.

FIG. 1 is a context diagram of the energy storage and management system as shown in configurations herein. Referring to FIG. 1, a vehicle 100 such as an 18-wheeler has a storage unit 110, typically a battery, for storing electrical energy. An energy management controller 120 has management logic 122 for directing electrical power gathered from sources, such as solar panels 130-1, regenerative brakes 130-2, exhaust recovery 130-3, and the alternator 130-4 of the vehicle (130, generally). Other sources may also be employed. The management logic 122 directs the gathered power to loads such as a comfort station 140-1 for a cab area 102, roof de-icing heaters 140-2, cold plates 140-3 for refrigerating the trailer payload 104, lighting systems 140-4, and liftgates 140-5 (140 generally).

The solar panels 150 may be of any suitable construction, and may vary depending on desired electrical characteristics and ruggedization/weather resistance. In one configuration, the panels are laminated consisting of a semi-flexible or rigid substrate, rows of cells that can be of any solar technology including mono-crystalline silicon, poly-crystalline, amorphous silicon, copper indium gallium selenide (CIGS) or other; and a transparent top sheet like ETFE or glass. The cells can either be positioned in two fields with power escapement and bus bar between them, or in a single field with escapement and bus bars to one side, discussed further below. The panel dimensions will optimize the size of the mounting structure and designed to be a building block approach allowing for successive panels to be attached reaching the desired power output. The field of cells can be populated with various types of cells to produce desired voltage and current. The panels will overlap each other along the long edge allowing for water tight seal and reduce uplift forces due to wind.

Figure 2:
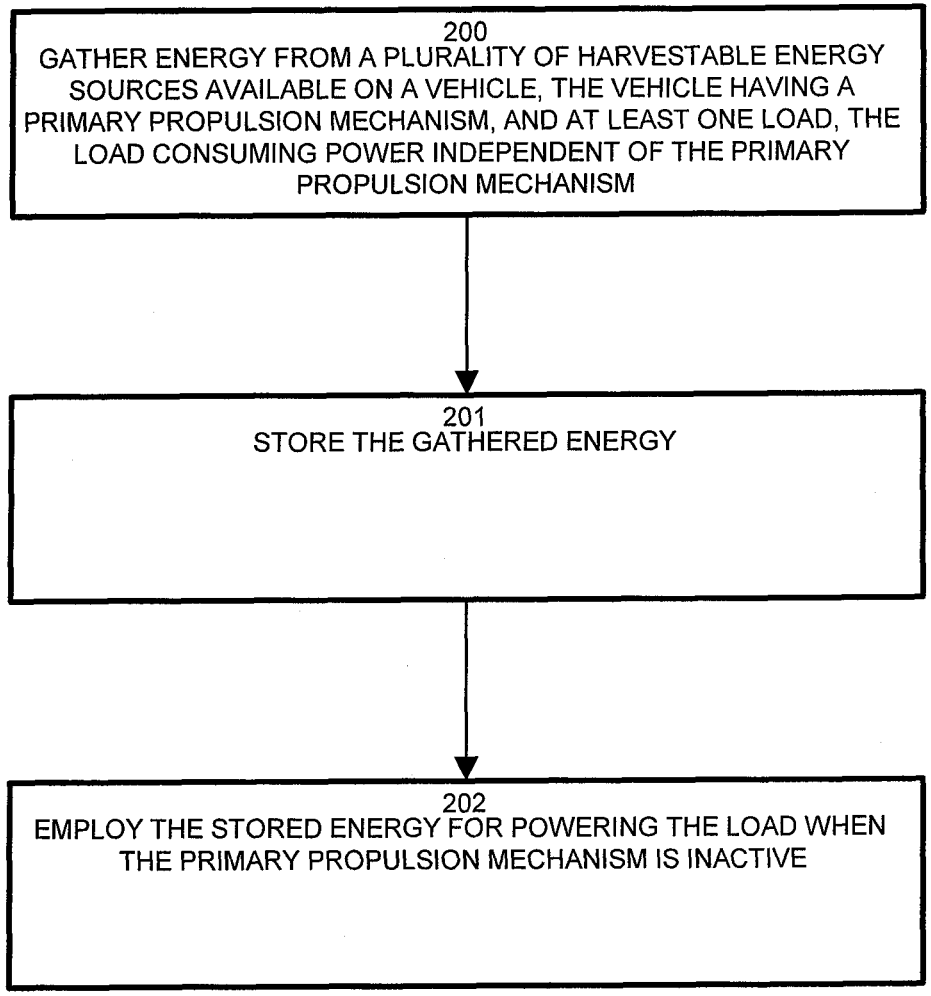
FIG. 2 is a flowchart of energy management in the system of FIG. 1.

FIG. 2 is a flowchart of energy management in the system of FIG. 1. Referring to FIGS. 1 and 2, the method for energy capture and management on a vehicle include gathering energy from a plurality of harvestable energy sources available on the vehicle, in which the vehicle has a primary propulsion mechanism, and at least one load consuming power independent of the primary propulsion mechanism, as depicted at step 200. A management controller 122 or central load center gathers energy from a plurality of sources 130 on a moving vehicle, such that the sources are normally untapped and not accessed for energy generation in conventional vehicles. Such sources generally differ from the sources employed for the primary propulsion source (i.e. diesel engine) such as an alternator for charging the conventional starting battery. Further, the alternator typically connects to loads directly related to the primary propulsion mechanism, such as a fuel pump, fuel injectors, and engine control systems. However, in particular configurations, the excess energy from the alternator, once the starting battery is determined to be fully charged, may be among the harvestable energy sources.

A battery or other storage medium stores the gathered energy, as depicted at step 201. It should be apparent the battery responsive to the energy capture and management system is separate from the starting battery, and has a capacity for maintaining an expected load for a duration spanning until the next full charge can be expected, i.e. overnight. For example, the battery may be sized to accommodate an overnight (6-8 hours) powering of comfort station.

The energy capture and management system then employs the stored energy for powering the load when the primary propulsion mechanism is inactive, as depicted at step 202. Alternatively, the loads may also be powered while the vehicle is in motion, however at this time the vehicle alternator often negates the need for supplemental power, as a moving vehicle maintains HVAC/comfort systems using engine heat and fans or blowers powered by the native alternator. It should be emphasized that one particular usage of the disclosed system is as an idle-free system when a stationary vehicle is prevented from employing the primary propulsion source as a power source for extraneous loads. It should be emphasized, however, that the energy management principles are not limited only to an idle-free, stationary vehicle context, but may also be invoked while the truck is in motion to eliminate load on engine. For example, reserve power may be employed to supplement cooling (both cab and payload) in extreme heat. Similarly, de-icing heaters may benefit for longer runtime during snowstorms.

Figure 3:
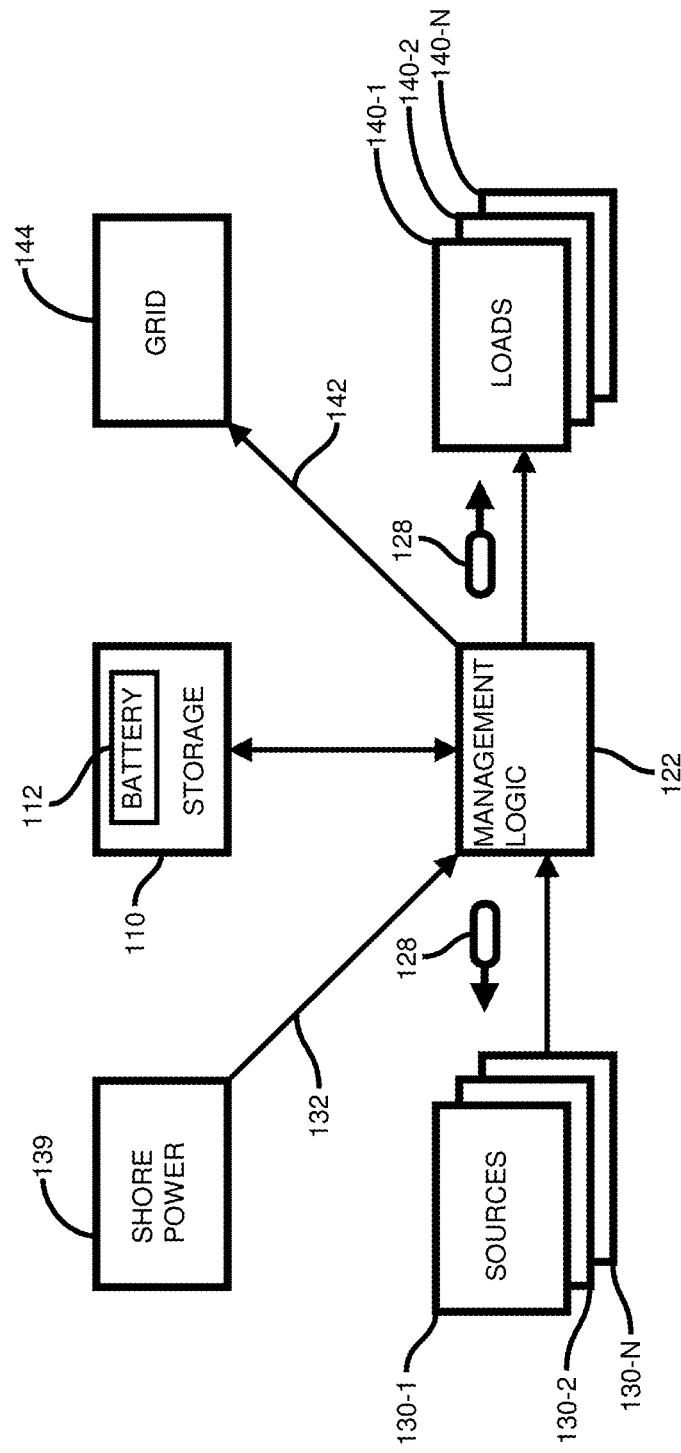
FIG. 3 is a block diagram of the system of FIG. 1.

FIG. 3 is a block diagram of the system of FIG. 1. Referring to FIGS. 1 and 3, the management logic 122 coordinates the storage and allocation of power between energy storage 110, including the battery 112 and other suitable storage mediums, discussed further below. The plurality of sources 130-1 . . . 130-N contribute electrical energy to storage 112, and the management logic 122 distributes the stored power to the loads 140-1 . . . 140-N. The management logic 122 allocates the power based on computed needs, taking into account factors such as time of day, ambient temperature and geographic location. An external interface 132 provides an additional source through a shore power hookup 139, as is commonly available at truckstops and other predetermined locations. Other suitable external "plug-in" types of sources may also be employed. Similarly, a grid interconnection interface 142 allows surplus energy from the battery 110 to feed into a grid interconnection 144 for supplemental power. The grid interconnection 144 may be employed for any suitable load, and may not necessarily inject power into the general utility medium, but may also be employed locally, for example by a warehouse having a number of trucks so equipped for mitigating utility draw of electricity.

Figure 4A:
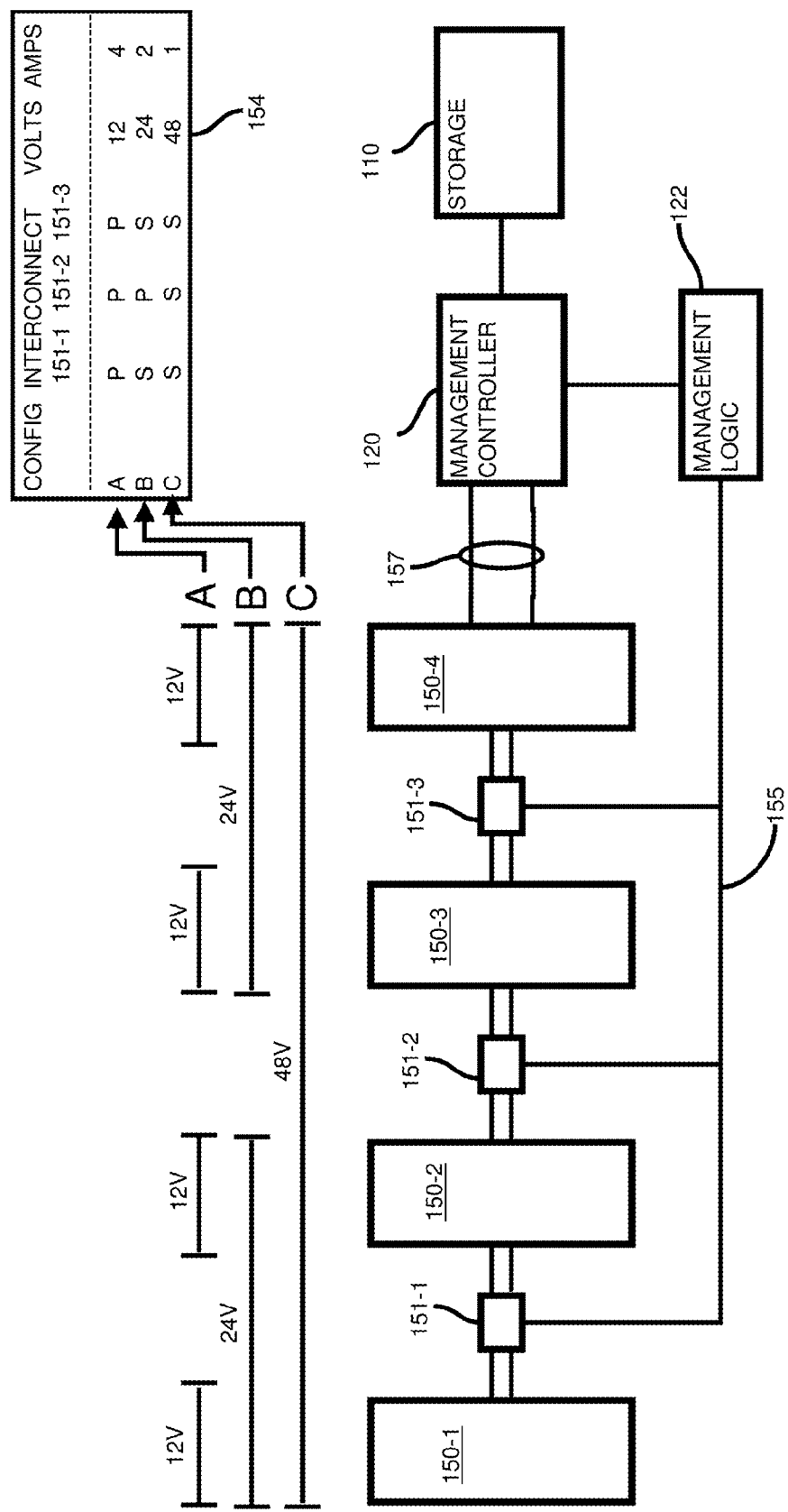
FIGS. 4A-4S are diagrams of particular examples of energy sources as in FIG. 3.
Figure 4B:
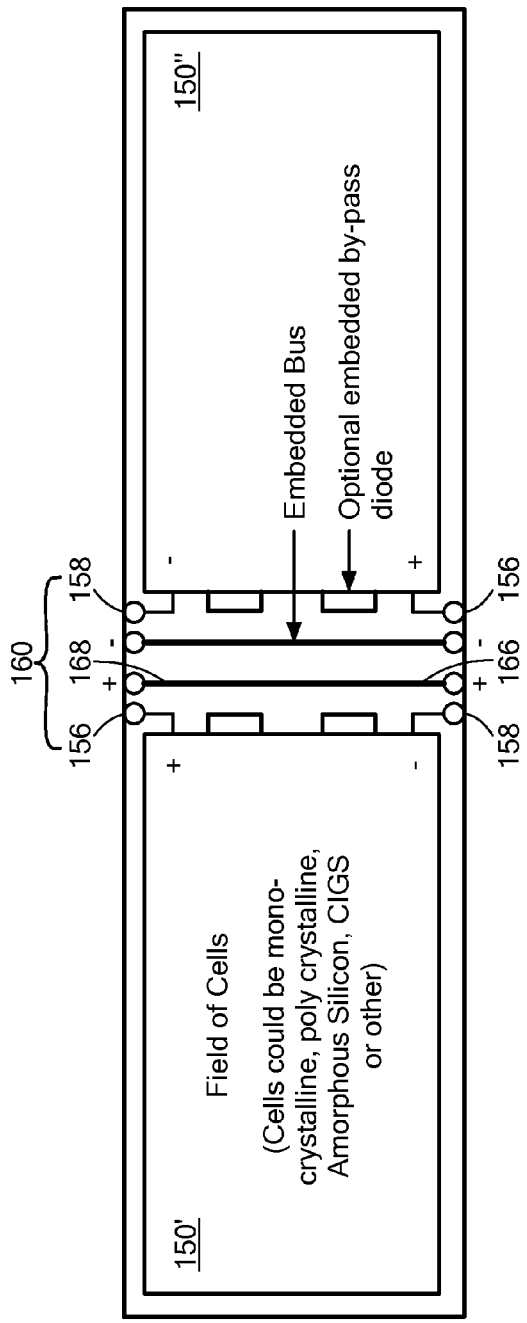
Figure 4C:
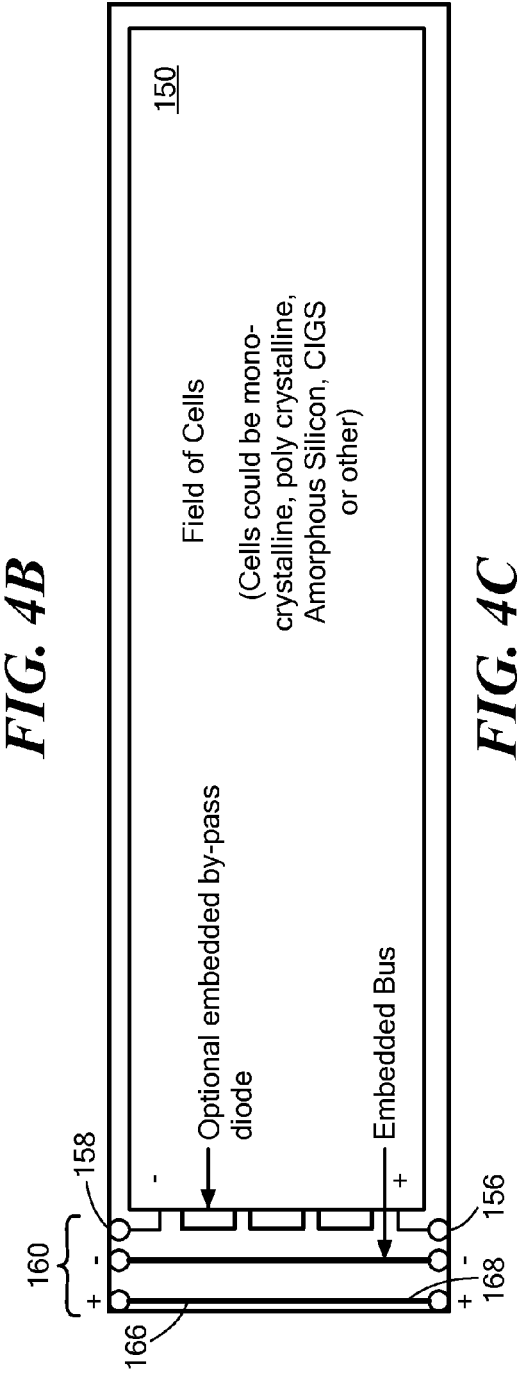
Figure 4D:
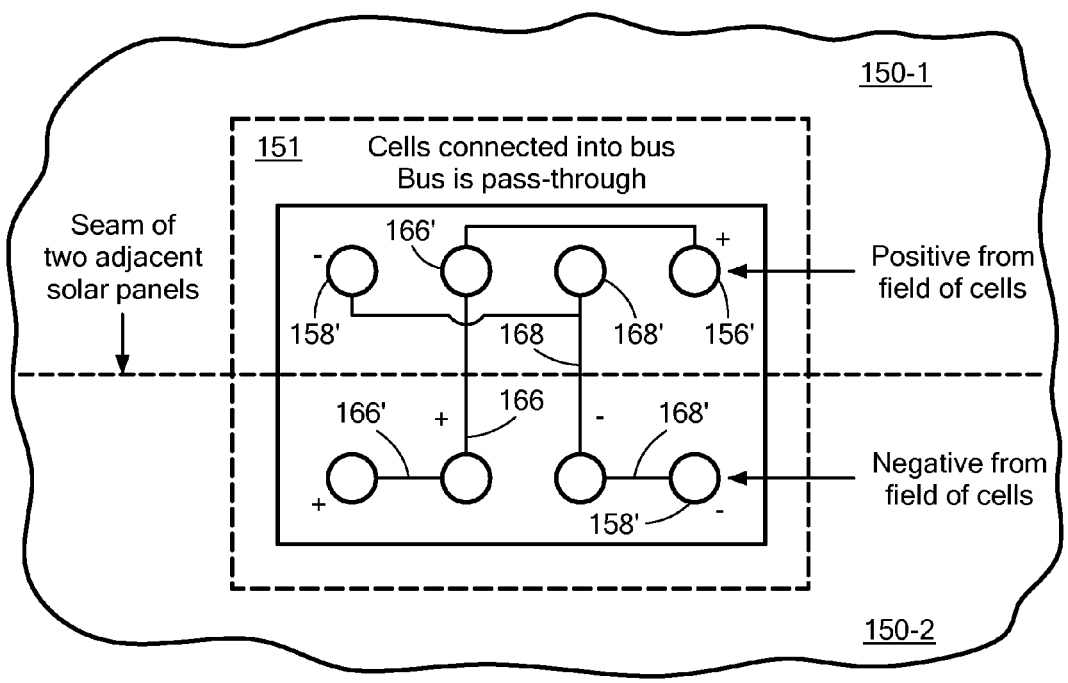
Figure 4E:
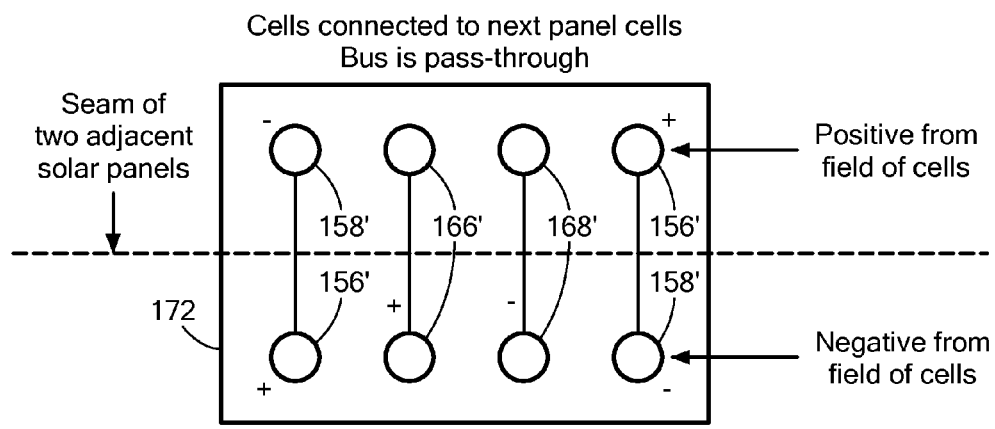
Figure 4F:
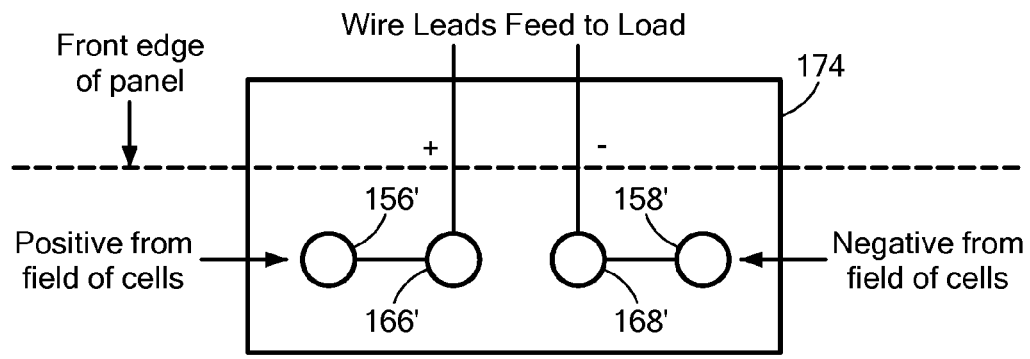
Figure 4G:
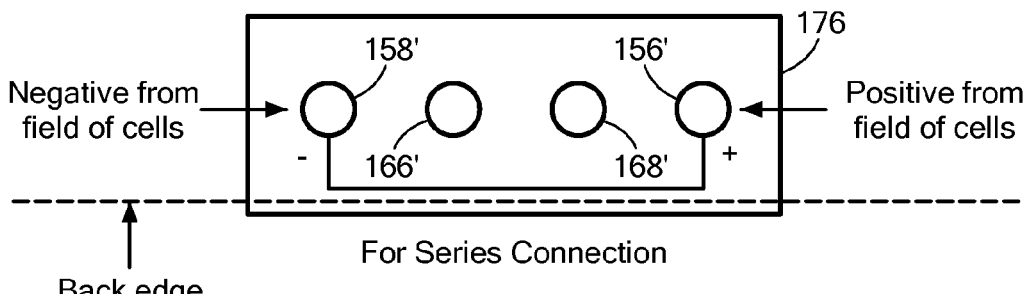
Figure 4H:
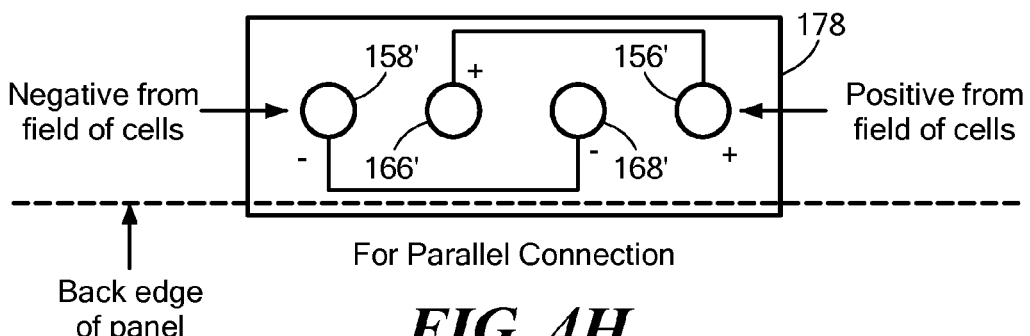
Figure 4I:
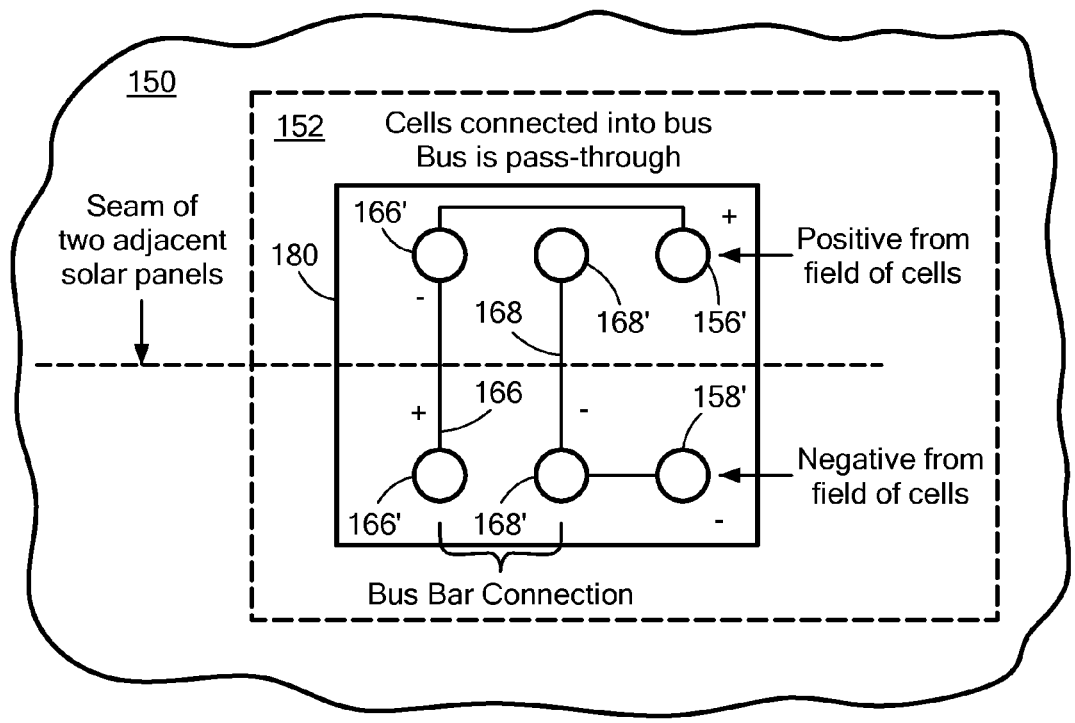
Figure 4J:
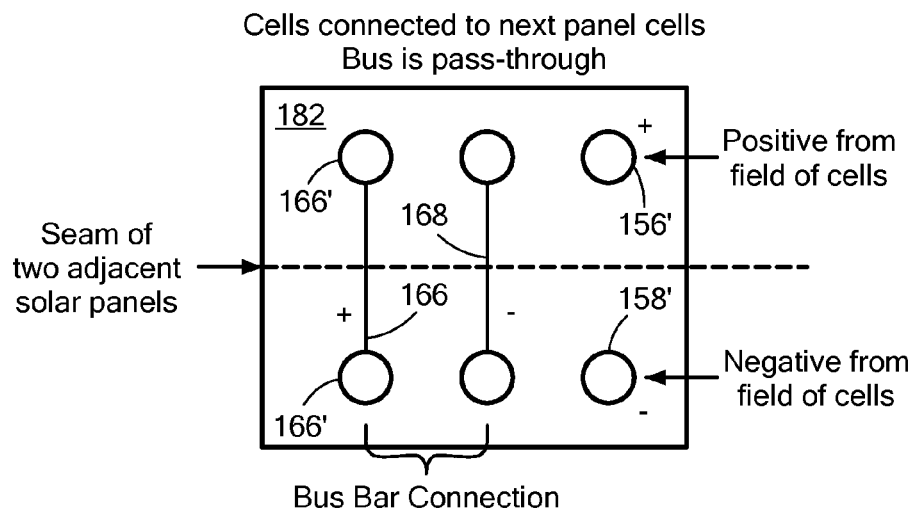
Figure 4K:
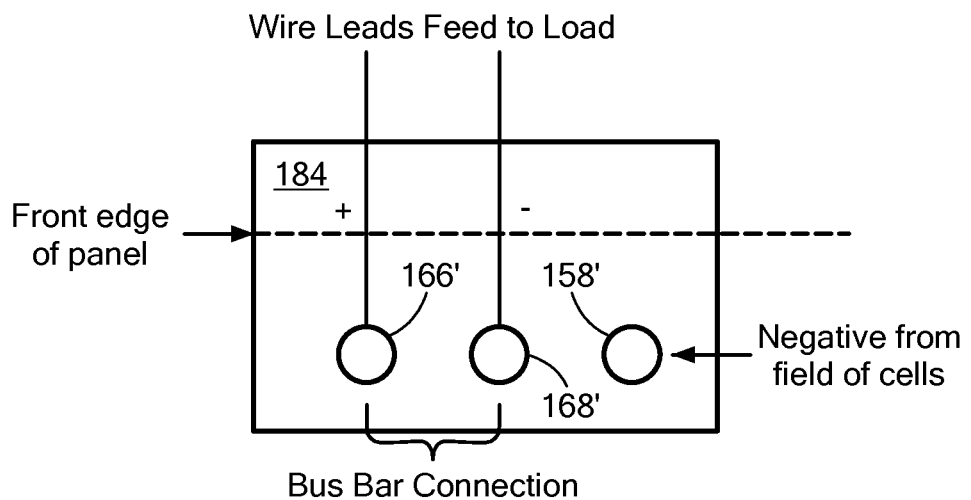
Figure 4L:
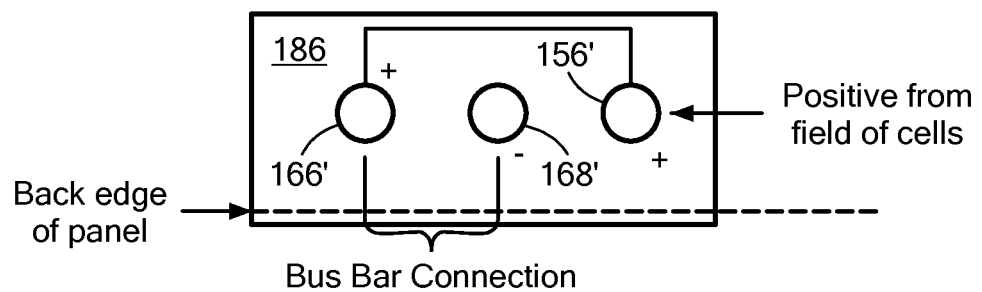
Figure 4P:
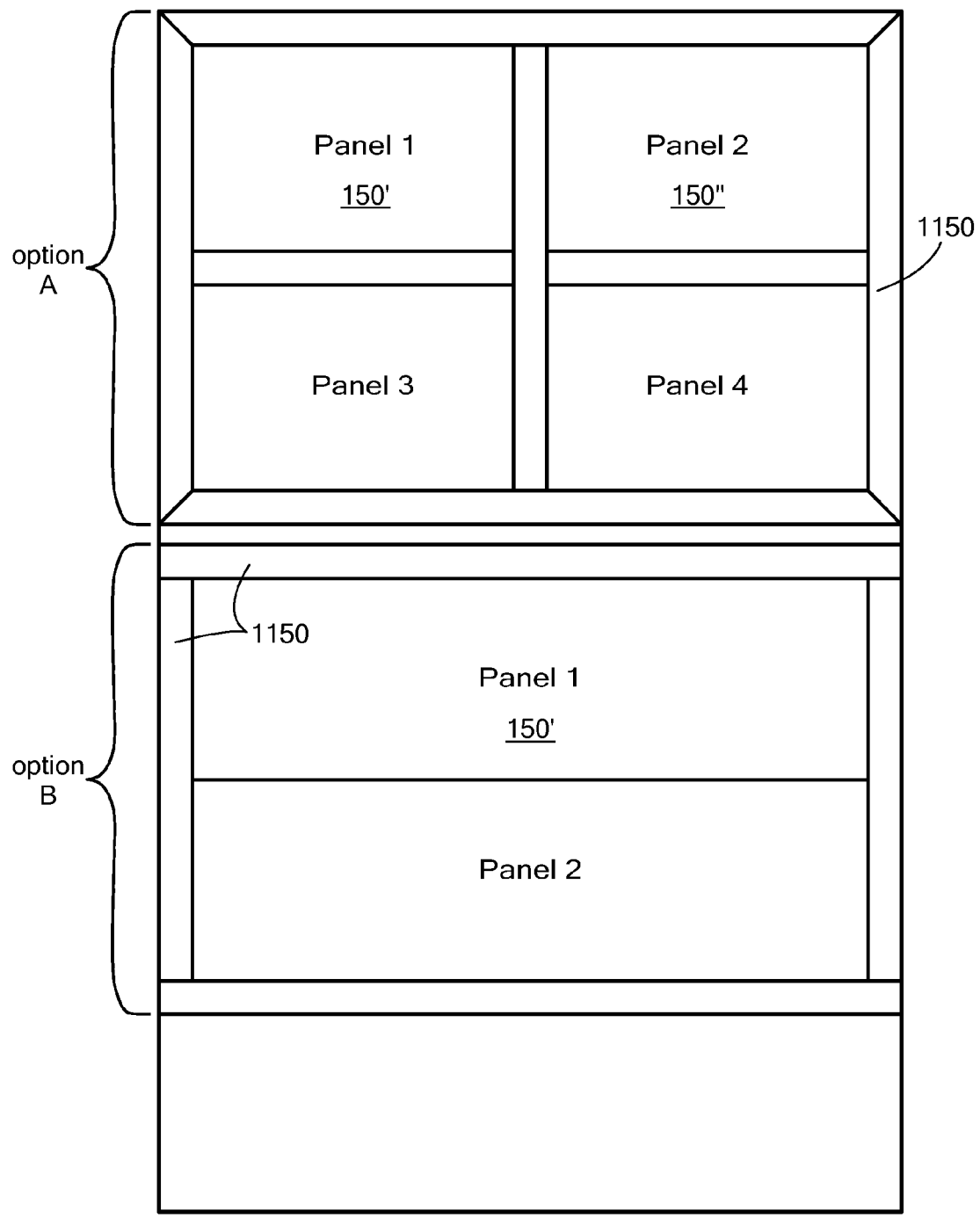
Figure 4S:
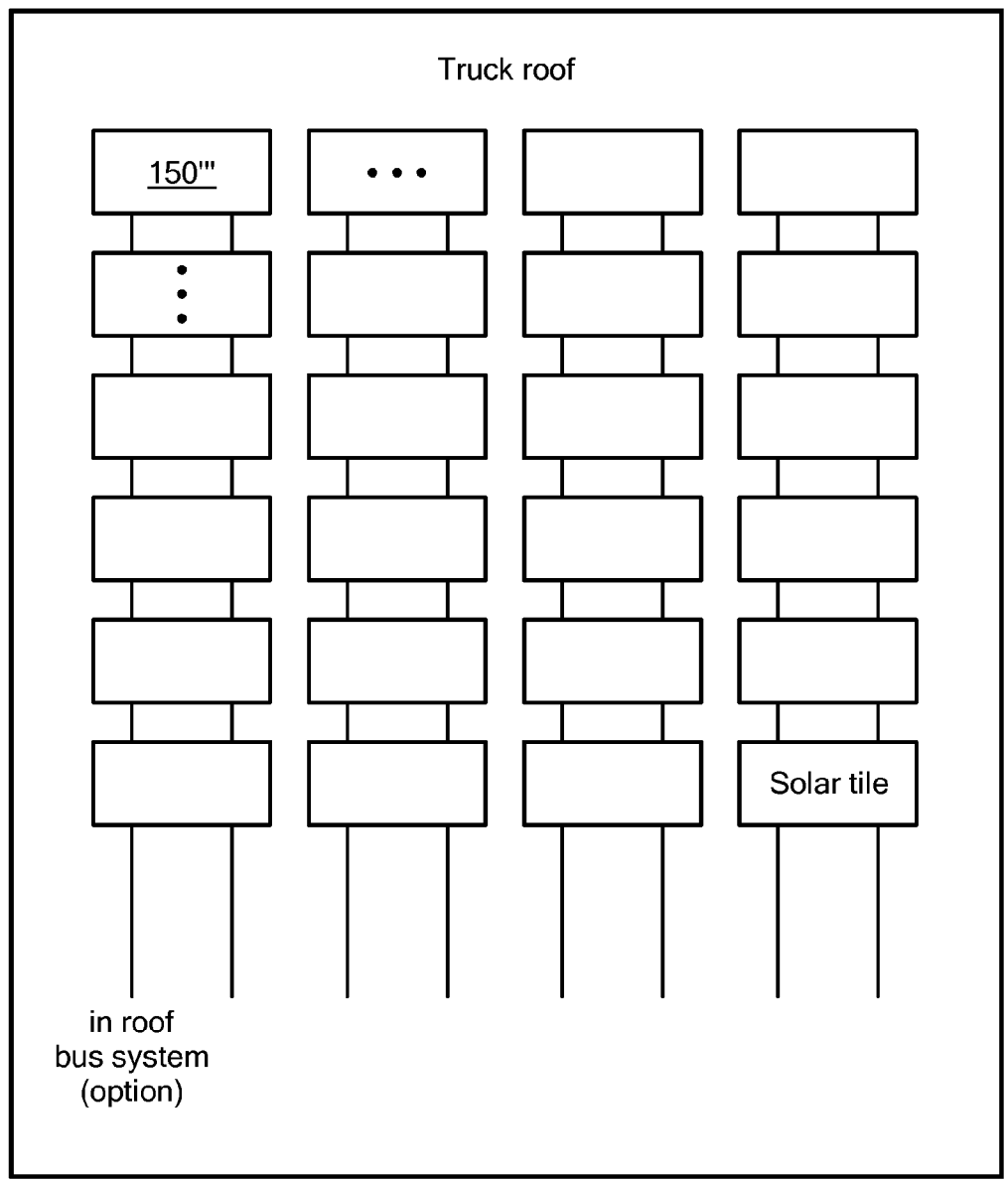

FIGS. 4A-4S are diagrams of particular examples of energy sources as in FIG. 1. Referring to FIGS. 4A, 3 and 1, FIG. 4A shows a general block diagram of the solar panel source 130-1. The solar panel source 130-1 includes a plurality of individual solar panels 150-1 . . . 150-4 (150 generally) attached by a selective coupling for remote parallel or serial connection. Alternatively, the selective coupling may also employ a direct connection for either a parallel or serial connection, as discussed further in the provisional patent application cited above. By switching between serial and parallel connection, the panels 150 are switchable to favor either greater voltage or amperage. In the example shown, each of the panels 150 delivers 12 volts(V) at 1 amp (assuming optimal sunlight conditions). An interconnect 151-1 . . . 151-3 couples each of the solar panels 150 to aggregate the voltage, via a serial connection, or provide greater amperage, via a parallel connection. Referring to the configuration chart 154, configuration A couples each of the 12V panels 150 in parallel (P), thus producing 12V at an aggregate of 4 A. Configuration B connects panels 150-1 and 150-2 in series (S), and panels 150-3 and 150-4 also in series, and connects panel 150-2 and 150-3 in parallel, therefore providing 24V at 2 A. Configuration C favors voltage, and provides 48 V by serial connections between each panel 150, but provides the 48V at only 1 A. In this manner, the management logic 122 may vary the current and voltage to provide faster charging when the battery 112 is low, or provide greater amperage when there is a large simultaneous draw. Further, the voltage parameters disclosed are example in nature, and not intended to limit or restrict the implemented range. Any suitable voltage/current arrangement may be employed, depending on the number and characteristics of available solar panels and the mode of storage expected by the battery 112. For example, a 120v AC source may be desirable for interoperability with conventional electric loads. Various voltage and current parameters may be incorporated, depending on available transformer and inverter equipment. For example. If employing a grid interconnection putting power into the grid from a parked trailer, it would be beneficial to boast voltage to 130 or 250 volts to more efficiently feed into grid, while switching back to lower voltages for vehicle based loads. The example of FIG. 4a is illustrative, and the panel characteristics for voltage and current, as well as the number of panels 150, may be varied. Shown below are several physical panel arrangements and manner of coupling. Remotely switched panels employ a control bus for transport of control information 128 between the management logic 122 and the interconnects 151, while a busbar interconnect 158 provides power communication across the panels 150. While the busbar interconnect 157 is generally higher gauge connection for power transport, the control bus 155 could be integrated in the busbar interconnect 157 by sending modulated signals over the busbar interconnect, in addition to the DC panel 150 power output, that is interpreted by the interconnects 151.

FIGS. 4B-4P show specific configurations of solar panels and interconnection methods. A variety of configurations are shown for electrically coupling the solar panels 150 to the controller 120. Referring to FIGS. 4B and 4C, an electrical bus 160 extends the length of the trailer for aggregating electrical charge from the panels 150. The bus 160 may take a variety of physical implementation, such as integration on the panel (as a circuit board, or PCB), through a substrate material supporting the panel, in a molding or conduit alongside or above the panel, embedded in a slot on the roof surface, or simply wired together by weathertight connectors. The integrated approach embeds or affixes the bus as a trace or conductor on the solar panels 150 for coupling to the interconnects 151, therefore avoiding a separate busbar structure on the roof since the interconnected panels form a continuous conductor. Other considerations include the physical construction of the panels, such as rigid silicon photovoltaic cells, or flexible sheets, along with any mounting substrate and insulation employed. Major considerations include 1) physically mounting the panels to a trailer roof with accommodation for flexing and vibration; 2) electrical coupling provided by the electrical bus 160 interconnection, and 3) accommodating physical constraints of the roof, i.e. roof arc with rigid solar panels.

FIGS. 4B and 4C illustrate center bus and side bus arrangements, respectively. In FIG. 4B, a center bus arrangement employs two solar panels 150' and 150", each having output terminals 156 (positive) and 158 (negative). The center bus arrangement has a positive bus conductor 166 and a negative bus conductor 168 extending between the solar panels 150', 150" and flanked by the panels and the output terminals 156, 158. FIG. 4C has output terminals 156 (positive) and 158 (negative) on one side of the solar panel 150, with adjacent bus conductors 166, 168.

The center and side terminal arrangements correspond to the center mount connectors of FIGS. 4D-4H, and the side mount connectors of FIGS. 4I-4L, respectively. The terminal arrangements are contained in an interconnection box enclosing an electrical junction between adjacent solar panels 150-1, 150-2. The interconnection box, shown as dotted line 151 is therefore the electrical junction between the sets of panels as well as the header connector, which takes the power from the panels via the center bus conductors 166, 168; and the terminator connector which is located on the last panel in a series, shown below in FIGS. 4K-4H. The interconnection box 151 may also employ solid state switching capability for remote operation by the management logic 122.

A hardwired version physically connects the output from the solar panels 150 to the cells of the next panel 150 for a series connection; or to the bus in a parallel connection. The series connection allows for higher voltage while keeping the current constant. The parallel connection allows for lower voltages but increasing the current. The interconnection box 151 is generally disposed over the exposed cell escapement conductors as well as posts or other electrical conductors defining positive and negative contacts, discussed below. It will be watertight sealed to avoid contamination by external elements reducing the possibility of corrosion. As shown in FIG. 4D, a parallel interconnector 170 connects the positive output of the cells 156 to the positive bus bar 166 via contact 156', and the negative output of the cells 158 to the negative bus bar 168 via contact 158'. It also connects the positive and negative bus bars to the next panel 150-(N+1) in a series, via corresponding bus connectors 166', 168'. It should be further noted how the contacts 156, 158, 156', 158', 166' 168' align in conjunction with the busbar 166, 168. Referring to FIG. 4E, a serial interconnector 172 passes through the bus bars 166, 168 to the next panel 150 (N+1) and also connects the positive side of the cells in one panel to the negative side of the cells in the next panel 150 (N+1) via the connectors 156', 158'.

Referring to FIGS. 4F-4H, a header 174 connects the first field of cells to the bus and connects external wires 166', 168' to the bus connectors 166', 168'. There are two types of terminator connectors, serial and parallel. A serial terminator 176 connects the positive connector 156' from one side field of cells to the negative connector 158' on the other side filed of cells, thus resulting in higher voltage. A parallel terminator 178 connector ties the positive connector 156' of the field of cells to the positive bus 166 (via terminal 166') and the negative connector 158' of the field of cells to the negative bus 168 (via terminal 168').

Referring to FIGS. 4I-4L, a side mounted bus connection employs analogous electrical couplings for the single pair of connectors on the full width panels 150. Like the center mounted interconnection box 151, the side mount interconnection box 152 maintains selective parallel 180 or serial 182. One difference is that it need connect only one field of cells instead of two. Likewise, the header connector 184 and the terminator connector 186 only connect one field of cells to couple corresponding positive 166' and negative 168' bus bar connections to corresponding positive 156' and negative 158' connectors from the solar panels 150 (field of cells).

Although depicted as manual, or hardwired connections, the interconnection boxes 151, 152 may perform electronic solid state switching responsive to the management logic 122. A solid state interconnection box will use electronic switching circuitry to establish connections within the interconnection box 151, 152 as described above. The switching will be controlled by data signals that are sent down the bus bar from the management controller 120 interface, or on separate data lines 155 (FIG. 4A), or wirelessly. The connectivity of the panels—either in serial or parallel will be controlled by the data signal. This feature will allow for dynamic control of the voltage output of the solar panels to suit the different load requirements. The dynamic control also allows for safety features to be implemented that disconnects the panels from the bus in certain conditions (to be discussed below).

The solid state interconnection boxes 151, 152 will include circuitry to monitor the characteristics of the panel including voltage output, current output, and temperature. By correlating panel data with irradiance and other panels the performance of each panel can be determined and alerts and proactive actions can be taken to repair or improve performance of the system. For instance if a panel is causing problems where the whole system is compromised, the faulty panel can be disconnected and by-passed. The system as a whole may produce less power, but will still be functional. Each interconnection box 151, 152 will have a unique data address so that the data signal can identify the corresponding interconnector 170, 172 and the panels 150 attached to it.

In conjunction with the interconnection box there is a management controller 120 interface that will be located nearer the load. Its function is to communicate with the interconnection box sending data signals to manage the serial and parallel configurations as well as various safety statuses. The tilt switch, manual cutoff and accelerometer would be connected into the management controller 120 interface.

The management controller 120 interface may will also have management logic 122 to effect power management of the sources of power and the distribution of the load. Three primary sources of power include the solar panels 150; the alternator 130-4; and shore power 139 where the vehicle is plugged into grid power. Secondary power sources may be regenerative braking; regenerative shock absorbers; and exhaust stack power recovery. The management logic 122 prioritizes electrical loads when conflict arises due to insufficient power. It will also manage loads due to time of day constraints or operational conditions.

The management controller 120 Interface will also have battery management capabilities that will ensure batteries are properly charged based on the chemistry of the battery. Multiple chemistries may be supported at the same time. When batteries are fully charged, the management controller 120 interface will direct any excess power generation back into the vehicle's alternator/electrical systems (including hybrid technology) to reduce the load on the alternator and subsequently the engine further reducing fuel usage.

A particular function of the management logic 122 in the management controller 120 will be a predictive solar power generation model. The purpose is to maximize the amount of energy from solar and minimize the amount of energy taken from the alternator or grid power. It also ensures that at the end of the operating day, sufficient power has been harvested for the storage systems to operate the loads in non-light periods.

FIGS. 4M-4R depict various physical layouts and arrangements of the solar panels 150. Referring to FIG. 4M, a plurality of structural panels 1100 define an integrated trailer roof and solar panel assembly. The panel 1100 itself is actually the structural trailer 104 roof. Each panel 1100 also integrates a full 150 or half width 150', 150" solar panels. FIG. 4N shows a side cutaway view of a lip junction between the panels 1100. Each panel 1100 has a lip 1110 adapted to engage a corresponding lip on the opposed panel 1100. FIG. 4O shows a similar arrangement employing a tongue 1120 and groove 1130 arrangement.

FIG. 4P shows an alternate configuration affixing the panels 150 to the trailer 104 roof. The panels 150, 150', 150" are secured using secured by any suitable means, such as an adhesive or slotted channel (i.e. "U" channel) bolted to the roof. Panels are adhered to absorb movement and vibration due to temperature and vehicular movement. A flexible solar panel may be affixed or adhered more tightly to the trailer roof, while a more rigid solar panel is contoured to match any arc of the trailer roof and further to allow for expansion between panels due to temperature.

A bus molding 1150, similar to a conduit, provides a weathertight encapsulation for the bus 166, 168 conductors and associated connectors to the panels 150. A first option, employing half width panels 150', 150", employs a center molding 1150, while the full width panels 150 define a second configuration employing a side molding 1150.

Another alternative, shown in FIGS. 4Q-4R, shows the solar panels 150, 150', 150" affixed to a substrate layer 1200 shown in the cutaway view of FIG. 4R. The substrate layer 1200 is therefore disposed between the solar panels 150 and trailer roof for support and insulation purposes.

FIG. 4S shows a tiled arrangement having a plurality of solar panels 150' having a plurality of panels "tiled" lengthwise and widthwise on the trailer roof. Busbar connections 166, 168 may be similar to those described above, and augmented with individual wires to connect the individual "tile" panels 150'. Alternatively, a plurality of bus connectors 166, 168 may run the length of the roof.

Figure 5:
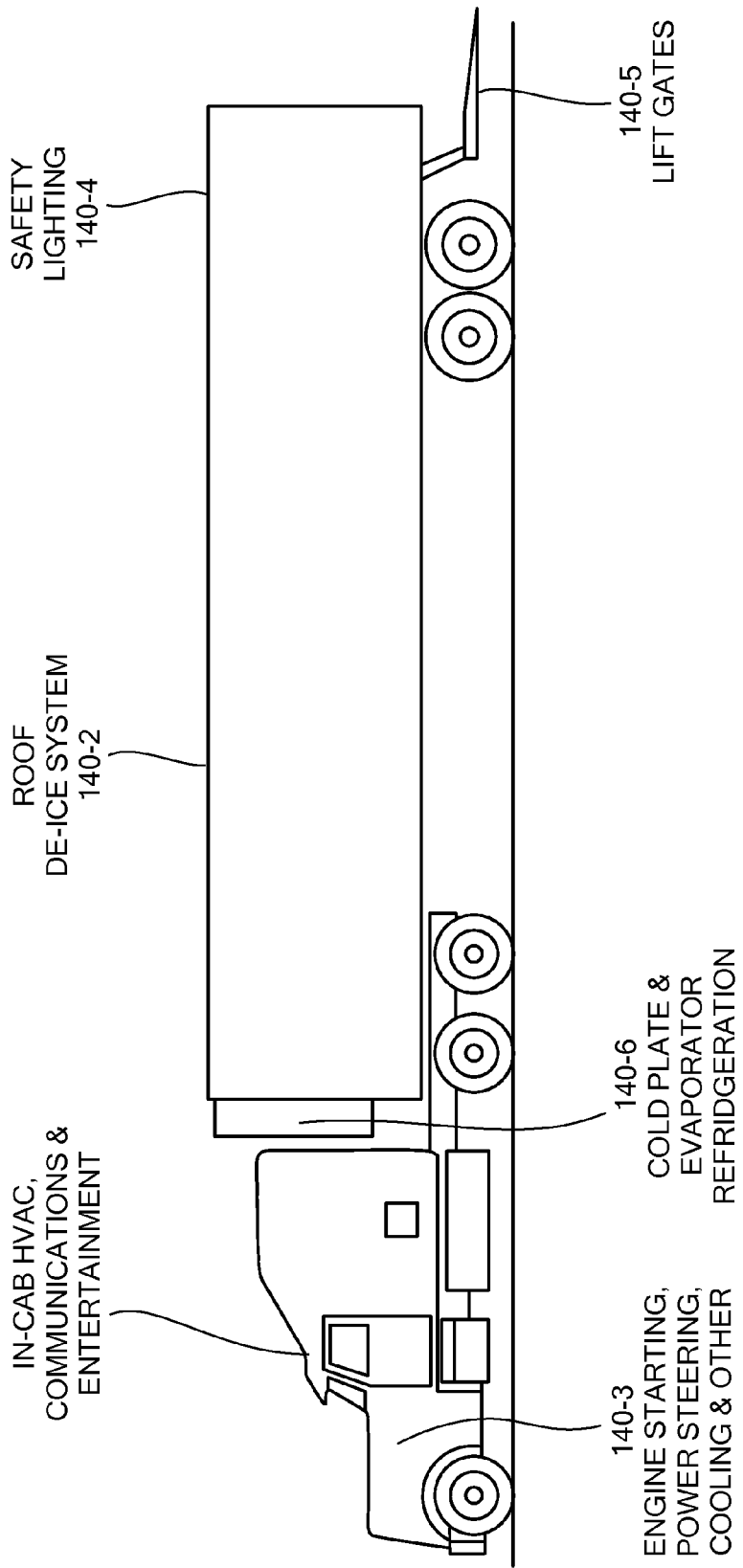
FIG. 5 is a diagram of particular loads as in FIG. 3.

FIG. 5 is a diagram of particular loads as in FIG. 3. As indicated above, various loads 140-1 . . . 140-6 may draw from the power allocated by the management logic 122, including comfort systems 140-1, roof de-icing systems 140-2, typically electric heaters, cold plate 140-3 and refrigeration systems for maintaining a cooled payload area for refrigerated loads, safety lighting 140-4, lift gates 140-5, and engine systems 140-6 related to the primary vehicle propulsion mechanism. Typically, engine support is adequately provided by the alternator and starter battery system as described above, however a selective coupling to the alternator for drawing excess power may also be employed for drawing power from the storage 110 system for the engine.

The management logic 122 allocates power so as to reserve power for higher priority needs based on anticipation of demand and duration of the vehicle loads 140, and also on expectations about sources 130 for recharging the battery 112. A utilization factor may be employed for identifying a pattern of demand and recharge. The utilization factor indicates the quantity of charge consumed between charge cycles. For example, if a full night of comfort station usage drains half the battery 112 capacity, and the next day's recharge is sufficient to recharge fully, than the utilization factor is 50%. In contrast, if the battery is required to power the comfort station and roof de-icing, and the following day is overcast with snow, the battery might be insufficient to extend to a second night running the comfort station and de-icing heaters. This level of demand indicates a utilization factor above 100%, meaning that the battery is employing 100% of charge and is still underpowered, suggesting that a larger battery is needed.

Figure 6A:
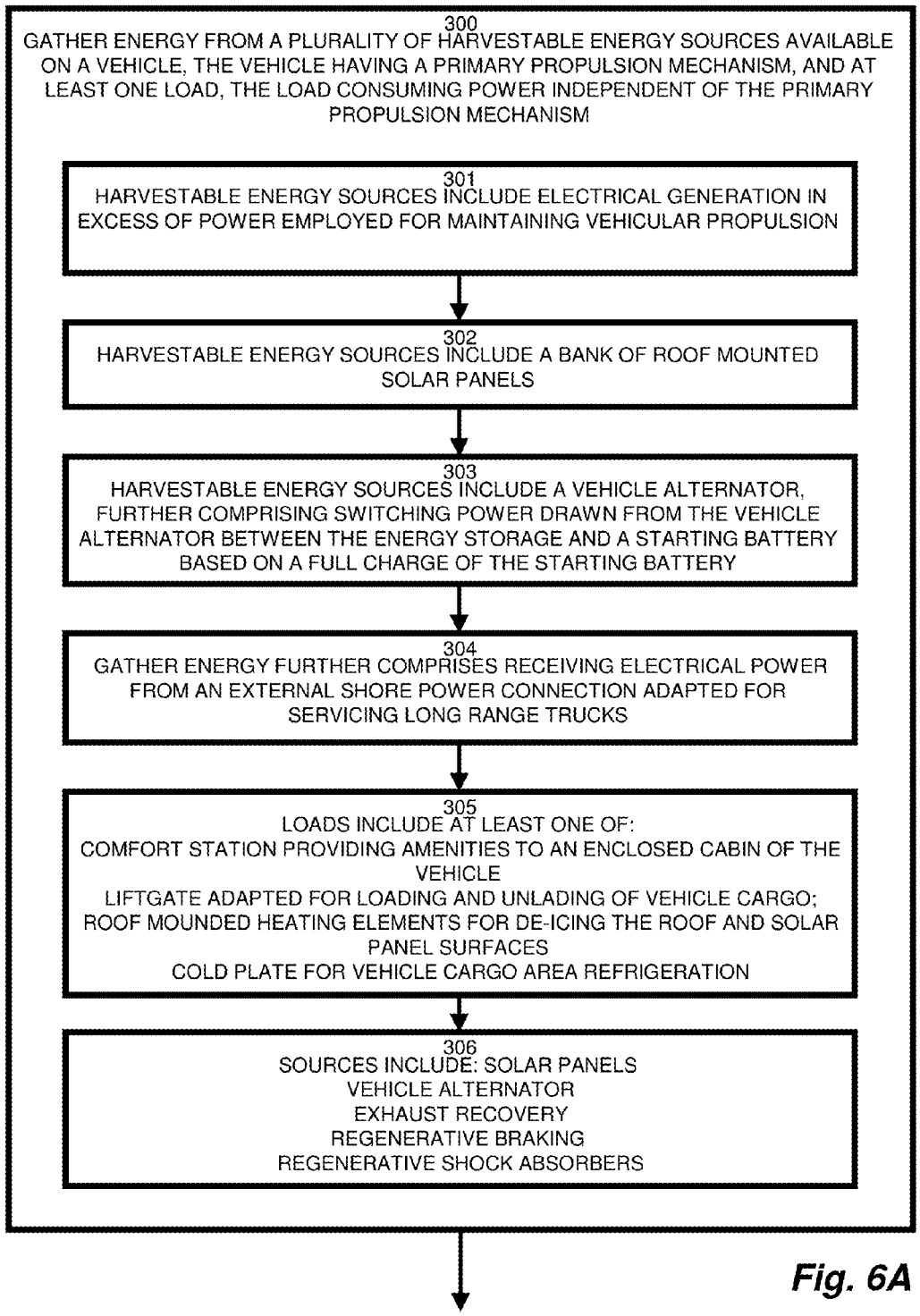
FIGS. 6A-6C are a flowchart of the management logic as in FIG. 3.
Figure 6B:
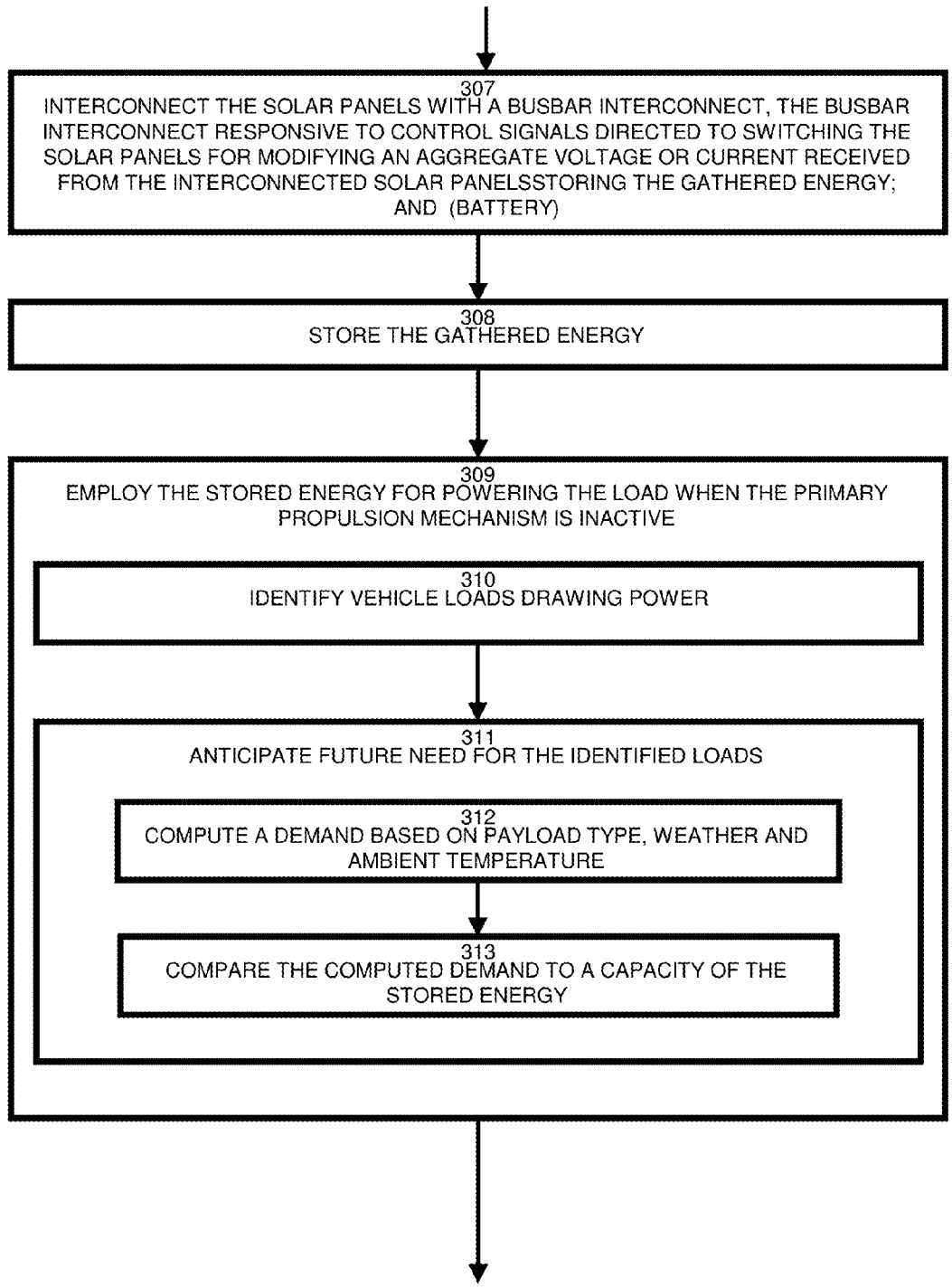
Figure 6C:
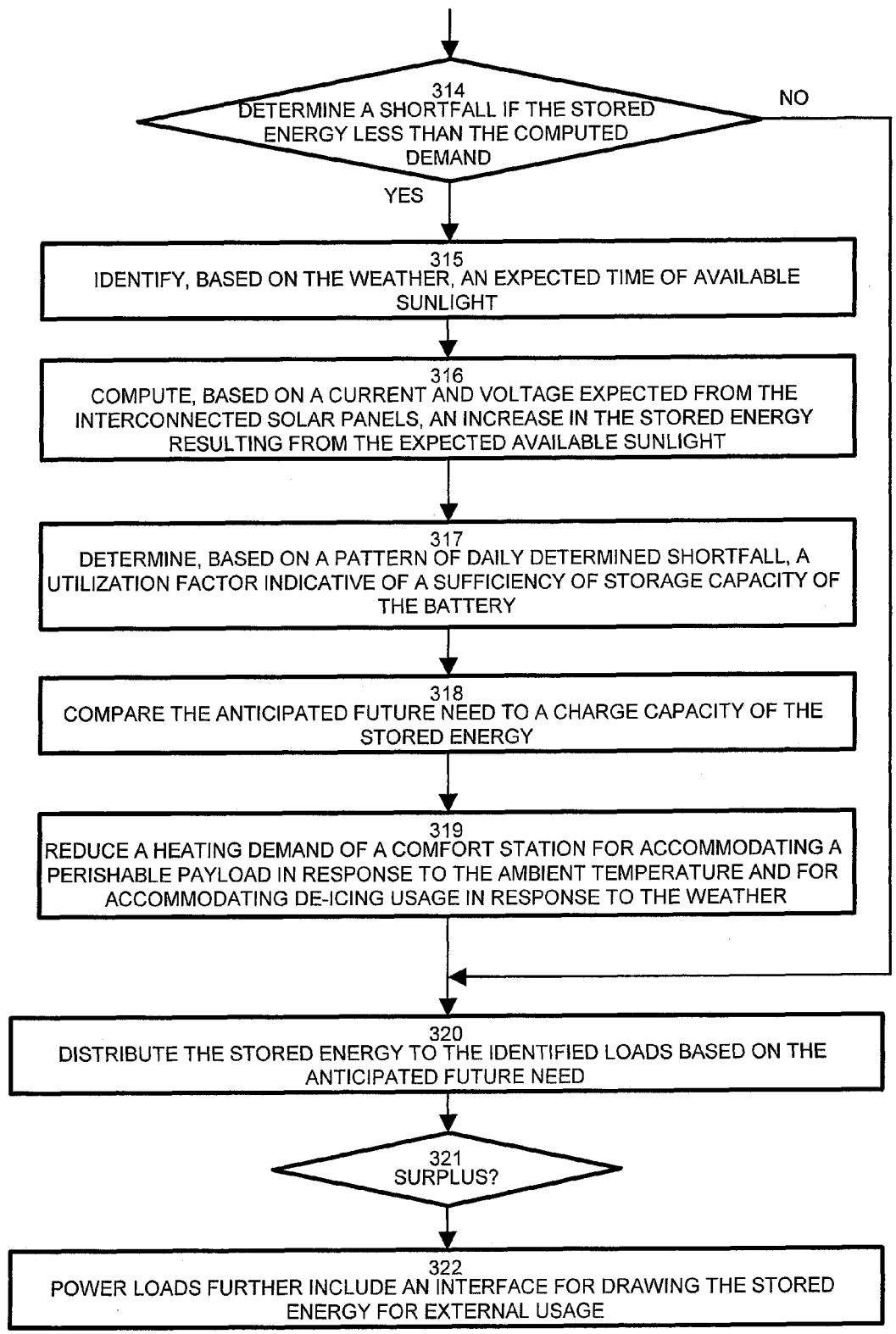

FIGS. 6A-6C are a flowchart of the management logic as in FIG. 3. Referring to FIGS. 1, 3 and 6A-6C, the management logic 122 directs and limits power to the various loads 140 based on computed predictions of future use. Usage factors include ambient temperature, time of day, and geographical location. For example, the management logic may have a computed daily consumption for which it needs to allocate power. The management logic computes the daily consumption, or load, by determining the ambient nighttime temperature (assuming truck is parked for comfort station usage), de-icing usage, based on precipitation predictions, refrigeration demand, based on payload and ambient temperature. If a shortfall is computed, the management logic abates usage according to a prioritized ranking. For example, if the stored electrical capacity cannot supply the computed demand, comfort station heat is reduced. If comfort station mitigation does not sufficiently reduce the draw, de-icing panel usage is reviewed to determine if an alternate route or shifted travel hours can reduce the demand, since de-icing is usually in response to geographically focused, short term weather conditions. If repeated shortfalls occur, the management logic may compute that the battery 112 size is insufficient, and prompt the operator accordingly.

The control flow of FIGS. 6A-6C depict example scenarios that may be incorporated in the management logic, and are intended to illustrate control variables and trade-offs that provide an effective result, rather than mandate enabling or disabling certain powered features. In one scenario, the management logic 122 employs known solar generation models for the amount of energy generated per hour given the geographic position, time of day, and day of year. It measures the irradiance or power generated over a past unit of time (for instance 15 minutes), the temperature of the panels (for correction of power generation), and compares the actual generation or irradiance against the model and creates a plus or minus factor. This method assumes the current conditions are representative for the rest of the solar day. A prediction of solar energy to be produced for the rest of the day is made based on the model modified by the plus or minus factor. The predicted generation is subtracted from the needed energy to satisfy the projected load (for instance to recharge the battery fully); and if there is additional charging needed, energy is also taken from the alternate source (alternator or shore power). If the predicted energy is sufficient to satisfy the load, then no energy will be taken from alternate sources.

This process will be repeated at preset intervals during the solar day to update the solar energy prediction and adjust the balance between solar and external sources. The process is also triggered when a substantial change is detected like change of solar output or change of energy requirements.

In another scenario, the management logic employs forecasted irradiance for the current geographic position. A measurement of actual irradiance or power generated over a past unit of time (for instance 15 minutes), the temperature of the panels (for correction of power generation), and compares the actual generation or irradiance against the predicted irradiance or power generation and creates a plus or minus factor. The prediction of solar energy to be produced for the rest of the day is made based on the irradiance prediction modified by the plus or minus factor. The predicted generation is subtracted from the needed energy to satisfy the projected load (for instance to recharge the battery fully); and if there is additional charging needed, energy is also taken from the alternate source (alternator or shore power). If the predicted energy is sufficient to satisfy the load, then no energy will be taken from alternate sources.

This process will be repeated at preset intervals during the solar day to update the solar energy prediction and adjust the balance between solar and external sources. The process is also triggered when a substantial change is detected like change of solar output or change of energy requirements.

The factors outlined above are coalesced and summarized in an example control flow now described with respect to FIGS. 6A-6C. The following control flow is intended as an example; other implementations may define different factors or priorities for power allocation. At step 300, the method for energy capture and management includes gathering energy from a plurality of harvestable energy sources 130 available on a vehicle 100, such that the vehicle has a primary propulsion mechanism such as a diesel or gasoline engine, and at least one load, in which the load consumes power independent of the primary propulsion mechanism. Thus, the electrical demand for engine operation and engine management, such as fuel pumps, fuel injectors, turbochargers, transmissions, emission, temperature and other sensors generally remain powered by the vehicle alternator, and need not rely on the energy management system as defined herein.

Therefore, the harvestable energy sources 130 include electrical generation in excess of power employed for maintaining vehicular propulsion, as depicted at step 301. In an example arrangement, the harvestable energy sources 130 include a bank of roof mounted solar panels 150, as disclosed at step 302. Depending on configuration, the harvestable energy sources 130 may also incorporate excess charge from a vehicle alternator, and further involve switching power drawn from the vehicle alternator between the energy storage and a starting battery based on a full charge of the starting battery, as depicted at step 303. Further, gathering energy may also include receiving electrical power from an external shore power connection 139 adapted for servicing long range trucks, as shown at step 304. Such shore power connections are obtainable at "plug in" stations typically located at service points for long-range trucks (i.e. truckstops). As an example, the loads may include at least one of a comfort station providing amenities to an enclosed cabin of the vehicle, a liftgate adapted for loading and unlading of vehicle cargo; a roof mounted heating elements for de-icing the roof and solar panel surfaces, and a cold plate or other refrigeration apparatus for vehicle cargo area refrigeration of perishable loads, as depicted at step 305. The harvestable sources available for management by the system include the solar panels 150 mounted on an exposed portion of the vehicle, the vehicle alternator; exhaust recovery; regenerative braking, and regenerative shock absorbers, as disclosed at step 306. Other sources of kinetic, thermal or electrical energy may be identified on the vehicle and converted to electricity for storage in the battery 110.

A busbar or other connector interconnects the solar panels, such that the busbar interconnect is responsive to control signals 128 directed to switching the solar panels 150 for modifying an aggregate voltage or current received from the interconnected solar panels, as shown at step 307. The battery 112 stores the gathered energy, as disclosed at step 308, and the management logic 122 employs the stored energy for powering the loads 140, typically when the primary propulsion mechanism is inactive such that no electrical support is provided by the vehicle alternator, as depicted at step 309.

The management logic identifies vehicle loads 140 drawing power, as depicted at step 310, and anticipates a future need for the identified loads 140, as shown at step 311. This includes computing a demand based on payload type, weather and ambient temperature, as shown at step 312, and comparing the computed demand to a capacity of the stored energy in the battery 122, as depicted at step 313.

A check is performed, at step 314, to determine a shortfall if the stored energy is less than the computed demand. In an ideal context, the battery 112 maintains sufficient storage capacity to power available systems until the next full charge. In a colder climate with sunny days, this might encompass running the comfort station 140-1 heater overnight, and relying on a full day of sunlight to recharge the battery 112. If cloudy weather is expected, the range might be two days until a full charge, and inclement weather (i.e. snow) might further burden the battery with de-icing heaters 140-2.

If a shortfall is indicated at step 314, then the management logic 122 identifies, based on the weather, an expected time of available sunlight, as shown at step 315. Management logic 122 computes, based on a current and voltage expected from the interconnected solar panels, an increase in the stored energy resulting from the expected available sunlight, as depicted at step 316. Expected current and voltage may be varied by the interconnection boxes 151, 152 discussed above. The management logic 122 determines, based on a pattern of daily determined shortfall, a utilization factor indicative of a sufficiency of storage capacity of the battery, as shown at step 317. The management logic 122 compares the anticipated future need to a charge capacity of the stored energy, as shown at step 318, and reduces a heating demand of a comfort station for accommodating a perishable payload in response to the ambient temperature and for accommodating de-icing usage in response to the weather, as shown at step 319. Various measures may be taking in response to a computed shortfall. For example, preservation of a refrigerated load (via cold plates 140-3) is likely to be considered a high priority, and power reserved for such a load. De-icing heaters 140-2 may be considered dispensable, as manual methods may suffice. Comfort station 140-1 usage is likely to be a lower priority, as a driver could seek accommodation elsewhere. Whether a shortfall is detected or not, the management logic 120 distributes the stored energy to the identified loads 140 based on the anticipated future need, as shown at step 320. If, at step 321, a surplus power level is indicated, then the power loads may further include an interface for drawing the stored energy for external usage, for example drawing electricity off the battery 112 for powering a local warehouse load or feeding into the utility grid.

It will be appreciated by those skilled in the art that alternate configurations of the disclosed invention, particularly with respect to programmed logic and/or telecommunication features disclosed above, include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a non-transitory computer readable storage medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

While the apparatus and methods defined herein have been particularly shown and described with references to embodiments thereof, it will be understood by those skilled in the art that various changes in form and details may be made therein without departing from the scope of the invention encompassed by the appended claims

The invention claimed is:

1. A method for energy capture and management comprising:
    gathering energy from a plurality of harvestable energy sources available on a vehicle, the harvestable energy sources including a bank of roof mounted solar panels, the harvestable energy sources including electrical generation in excess of power employed for maintaining vehicular propulsion, the vehicle having a primary propulsion mechanism, and at least one load, the load consuming power independent of the primary propulsion mechanism;
    interconnecting the solar panels with a busbar interconnect, the busbar interconnect responsive to control signals directed to reconfiguring the solar panels for modifying an aggregate voltage or current received from the interconnected solar panels storing the gathered energy; and
    employing the stored energy for powering the load when the primary propulsion mechanism is inactive, further comprising:
        computing a demand based on payload, weather and ambient temperature;
        comparing the computed demand to a capacity of the stored energy;
        determining a shortfall if the stored energy is less than the computed demand; and
        reducing a heating demand of a comfort station for accommodating a perishable payload in response to the ambient temperature.

2. The method of claim 1 further comprising interconnecting the solar panels via an integrated bus on the solar panels, the integrated bus defined by a conductive portion of the solar panel adapted to form a continuous conductor along a plurality of solar panels.

3. The method of claim 1 wherein employing the stored energy further comprises:
    identifying a plurality of vehicle loads drawing power;
    anticipating future need for the identified plurality of loads;
    comparing the anticipated future need to a charge capacity of the stored energy; and
    distributing the stored energy to the identified loads based on the anticipated future need.

4. The method of claim 1 further comprising reducing the heating demand for accommodating de-icing usage in response to the weather.

5. The method of claim 4 wherein computing the demand further comprises:
    identifying, based on the weather, an expected time of available sunlight;
    computing, based on a current and voltage expected from the interconnected solar panels, an increase in the stored energy resulting from the expected available sunlight; and
    determining, based on a pattern of daily determined shortfall, a utilization factor indicative of a sufficiency of storage capacity of the battery.

6. The method of claim 1 wherein the loads include at least one of:
    comfort station providing amenities to an enclosed cabin of the vehicle;
    liftgate adapted for loading and unloading of vehicle cargo;
    roof mounted heating elements for de-icing the roof and solar panel surfaces; and
    cold plate for vehicle cargo area refrigeration.

7. The method of claim 1 wherein the harvestable sources include
    solar panels mounted on an exposed portion of the vehicle;
    vehicle alternator;
    exhaust recovery;
    regenerative braking; and
    regenerative shock absorbers.

8. The method of claim 1 wherein the harvestable energy sources include a vehicle alternator, further comprising switching power drawn from the vehicle alternator between the energy storage and a starting battery based on a full charge of the starting battery.

9. The method of claim 1 wherein gathering energy further comprises receiving electrical power from an external shore power connection adapted for servicing long range trucks.

10. The method of claim 1 wherein the power loads further include an interface for drawing the stored energy for external usage.

11. A mobile energy storage and management controller comprising:
    a storage interface to an electrical storage component on a vehicle, the vehicle having a primary propulsion mechanism;
    a gathering interface configured to receive electrical energy gathered from the vehicle, the gathering interface responsive to generation sources on the vehicle, the generation sources including a bank of roof mounted solar panels, the generation sources including electrical generation in excess of power employed for maintaining vehicular propulsion;
    a busbar interconnect for interconnecting the solar panels, the busbar interconnect responsive to control signals directed to switching the solar panels for modifying an aggregate voltage or current received from the interconnected solar panels; and
    power management logic for allocating power to loads on the vehicle based on current and anticipated demand, the allocated power for accommodating inactivity of the primary propulsion mechanism when allocating the power, the power management logic configured to:
    compute a demand based on payload, weather and ambient temperature;
    compare the computed demand to a capacity of the stored energy;
    determine a shortfall if the stored energy is less than the computed demand; and
    reduce a heating demand of a comfort station for accommodating a perishable payload in response to the ambient temperature and for accommodating de-icing usage in response to the weather.

12. The controller of claim 11 wherein the gathering interface is responsive to harvestable energy sources of electrical generation in excess of power employed for maintaining vehicular propulsion.

13. The controller of claim 12 wherein the power management logic is configured to:
    identify loads on the vehicle;
    anticipate future need for the identified loads;
    compare the anticipated future need to a charge capacity of the stored energy; and
    distribute the stored energy to the identified loads based on the anticipated future need.

14. The controller of claim 12 wherein the gathering interface is further responsive to:
- a vehicle alternator, the management logic configured for switching power drawn from the vehicle alternator between the energy storage and a starting battery based on a full charge of the starting battery; and
- electrical power from an external shore power connection adapted for servicing long range trucks.

15. The controller of claim 13 wherein the management logic is further configured to:
- identify, based on the weather, an expected time of available sunlight;
- compute, based on a current and voltage expected from the interconnected solar panels, an increase in the stored energy resulting from the expected available sunlight; and
- determine a utilization factor indicative of a sufficiency of storage capacity of the battery.

16. The controller of claim 11, further including a remotely selectable solar panel interconnect, comprising:
- a first set of power connections adapted for electrical coupling with a first adjacent solar panel;
- a second set of power connections adapted for electrical coupling with a busbar or a second adjacent solar panel; and
- a switch responsive to switching logic for establishing a serial or parallel connection between the first adjacent solar panel and either the second adjacent solar panel or the busbar.

17. The controller of claim 16 wherein the switch is responsive to establish connections of like polarity or dissimilar polarity for establishing the serial or parallel connection, the serial connection configured to combine voltage, the parallel connection configured to combine current.

18. The controller of claim 17 wherein the plurality of solar panels further comprises a series of adjacent solar panels arranged in sequence on an elongated vehicle roof for substantial coverage of an available roof area for energy harvesting.

19. The controller of claim 17 further comprising a safety interlock, the safety interlock configured to:
- detect excessive voltage and temperature from the solar panels;
- detect impact causing physical compromise to the battery sources; and
- shutdown the sources for avoiding hazardous operation.

20. The method of claim 1 further comprising directing the busbar interconnect via the control signals to establish a serial or parallel connection to another solar panel of the interconnected solar panels.

21. The method of claim 1 further comprising
- computing a demand based on payload type, weather and ambient temperature;
- identifying, based on ambient weather, an expected time of available sunlight;
- computing, based on a current and voltage expected from vehicle mounted interconnected solar panels, an increase in the stored energy resulting from the expected available sunlight;
- comparing the computed demand to a capacity of the stored energy resulting from the increase;
- determining a shortfall if the stored energy is less than the computed demand; and
- determining, based on a previous pattern of daily determined shortfall, a utilization factor indicative of a sufficiency of storage capacity of the battery.

22. A method for energy capture and management comprising:
- gathering energy from a plurality of harvestable energy sources available on a vehicle, the harvestable energy sources including a bank of roof mounted solar panels, the harvestable energy sources including electrical generation in excess of power employed for maintaining vehicular propulsion, the vehicle having a primary propulsion mechanism, and at least one load, the load consuming power independent of the primary propulsion mechanism;
- interconnecting the solar panels with a busbar interconnect, the busbar interconnect responsive to control signals directed to switching the solar panels for modifying an aggregate voltage or current received from the interconnected solar panels storing the gathered energy; and
- employing the stored energy for powering the load when the primary propulsion mechanism is inactive;
- computing a demand based on payload type, weather and ambient temperature;
- identifying, based on ambient weather, an expected time of available sunlight;
- computing, based on a current and voltage expected from vehicle mounted interconnected solar panels, an increase in the stored energy resulting from the expected available sunlight;
- comparing the computed demand to a capacity of the stored energy resulting from the increase;
- determining a shortfall if the stored energy is less than the computed demand; and
- determining, based on a previous pattern of daily determined shortfall, a utilization factor indicative of a sufficiency of storage capacity of the battery.

* * * * *